US006615905B2

(12) United States Patent
Rhodes et al.

(10) Patent No.: US 6,615,905 B2
(45) Date of Patent: Sep. 9, 2003

(54) METHOD OF MAKING AN AIR PREHEATER ROTOR

(75) Inventors: Robin B. Rhodes, Wellsville, NY (US); Jon R. Cowburn, Ulysses, PA (US); Kurt M. Fierle, Wellsville, NY (US)

(73) Assignee: Alstom (Switzerland) Ltd, Baden (CH)

( * ) Notice: Subject to any disclaimer, the term of this patent is extended or adjusted under 35 U.S.C. 154(b) by 0 days.

(21) Appl. No.: 10/093,716

(22) Filed: Mar. 7, 2002

(65) Prior Publication Data

US 2002/0088603 A1 Jul. 11, 2002

Related U.S. Application Data

(62) Division of application No. 09/643,530, filed on Aug. 22, 2000.

(51) Int. Cl.[7] .............................. F23L 15/02; B23B 6/00; B23Q 17/22
(52) U.S. Cl. ................................ 165/8; 165/4; 29/890; 29/407.09
(58) Field of Search ....................... 29/890.031, 407.01, 29/407.05, 407.09, 464, 525.02; 165/10, 9, 8, 4, 6

(56) References Cited

U.S. PATENT DOCUMENTS

| | | | | |
|---|---|---|---|---|
| 1,762,426 A | * | 6/1930 | Söhr et al. | |
| 4,159,573 A | * | 7/1979 | Plihal | 29/464 |
| 4,234,038 A | * | 11/1980 | Dravnieks | 165/10 |
| 5,456,310 A | * | 10/1995 | Brophy et al. | 165/9 |
| 5,586,391 A | * | 12/1996 | Micale | 29/407.05 |
| 5,803,157 A | * | 9/1998 | Brophy et al. | 165/9 |
| 5,836,378 A | * | 11/1998 | Brophy et al. | 165/9 |
| 6,068,045 A | * | 5/2000 | Fierly et al. | 165/8 |
| 6,257,318 B1 | * | 7/2001 | Fierly et al. | 165/8 |
| 6,260,606 B1 | * | 7/2001 | Fierle et al. | 165/8 |

FOREIGN PATENT DOCUMENTS

| FR | 1.415.152 | * of 1965 |
|---|---|---|
| FR | 2.131.878 | * of 1972 |

OTHER PUBLICATIONS

International Search Report corresponding to International Application No. PCT/US 01/24304 dated Mar. 8, 2001.*

* cited by examiner

Primary Examiner—Henry Bennett
Assistant Examiner—Tho V Duong
(74) Attorney, Agent, or Firm—Russell W. Warnock (57) ABSTRACT

A method for constructing a rotor of an air preheater having a plurality of diaphragm plates dividing the rotor into a number of wedge-shaped compartments. Each compartment includes compartment components such as a rotor shell plate, a hot end rotor angle, a cold end rotor angle, and one or more stay plates and means for locating at least a portion of each of the components within the compartment. The diaphragm plates are manufactured by marking at least one index location associated with each compartment component on each diaphragm plate blank utilizing a template identifying the index locations and forming an opening at each index location. Each compartment is assembled by positioning a first diaphragm plate adjacent to a second diaphragm plate and locating each compartment component between the adjacent diaphragm plates by engaging the locating means of the component in an associated opening in one of the diaphragm plates. The locating means may comprise at least one tab extending from each of the sides of the compartment components. The tabs are inserted into the associated opening in one of the diaphragm plates to locate the component.

20 Claims, 8 Drawing Sheets

METHOD OF MAKING AN AIR PREHEATER ROTOR

CROSS-REFERENCE TO RELATED APPLICATIONS

This application is a divisional of copending U.S. patent application Ser. No. 09/643,530 filed Aug. 22, 2000.

BACKGROUND OF THE INVENTION

The present invention relates to rotary regenerative air preheaters. More particularly, the invention relates to apparatus for locating components of an air preheater during the construction thereof.

Many preheater rotors utilize stay plates, rotor shell plates, and rotor angles as structural support and seal support members. Based on requirements of adjoining parts such as baskets, pin racks, peripheral seals and rotor covers, these items must be located very accurately. During construction of conventional air preheaters, the stay plates, rotor shell plates, and rotor angles are individually located in each compartment as that compartment is assembled. The position of each of these items is determined by taking measurements from the rotor post at the top and bottom of each diaphragm plate and snapping a line to mark each location. Once these items are located, they must be tack welded into place until the rotor is fully constructed. Accumulation of tolerances quite often causes problems, requiring removal of tack welds and repositioning of rotor components.

The problems associated with constructing the rotors in the manner described above are aggravated by the fact that a significant portion of such rotors are typically constructed in the field. The number of shop built compartments versus field built compartments varies based on the rotor design and the rotor size. One arrangement, of many, has six 30° shop built compartments and six 30° field built compartments, with a field built compartment being disposed between each shop built compartment.

Reliance on shop or field personnel to layout the individual components results in errors which are often not discovered until the assembly is complete. These errors require either rework of the assembly or the manufacture of special heat exchange material baskets, pin rack installation material, peripheral seals, and/or rotor covers.

Outage duration is also a major concern when installing new rotors. Laying out the location of the stay plates, shells and rotor angles is very time consuming.

SUMMARY OF THE INVENTION

The present invention relates to a method for constructing a rotor of an air preheater, where the rotor comprises a plurality of diaphragm plates, which divide the rotor into a number of wedge-shaped compartments. In addition to the diaphragm plates, each compartment includes compartment components such as a rotor shell plate, a hot end rotor angle, a cold end rotor angle, and one or more stay plates. Each compartment component includes means for locating at least a portion of the component within the compartment. The diaphragm plates are manufactured by marking at least one index location associated with each compartment component on each diaphragm plate blank utilizing a template or other means identifying the index locations and forming an opening at each index location. Each compartment is assembled by positioning a first diaphragm plate adjacent to a second diaphragm plate at an acute angle and locating each compartment component between the adjacent diaphragm plates by engaging the locating means in an associated opening in one of the diaphragm plates. The rotor is assembled by assembling all of the compartments as recited above and then fixedly mounting the compartment components to the diaphragm plates.

In one embodiment, the locating means comprises at least one tab extending from each of the sides of the compartment components. The tab extending from one side of each compartment component is inserted into the associated opening in one of the diaphragm plates and the tab extending from the other side of each compartment component is inserted into the associated opening in the other diaphragm plate to locate the component.

In another embodiment, the locating means comprises a plurality of pins. A first end portion of one of the pins is inserted through one of the openings until a middle mounting portion is disposed within the opening and the first and second end portions extend from the first and second sides of the diaphragm plate, respectively. The pin is then mounted to the diaphragm plate. These steps are repeated until a pin is mounted in predetermined openings in the diaphragm plate. The compartment components are located by positioning each component in engagement with one or more of the pins.

An object of the invention is to provide a simplified, accurate and time saving means to locate stay plates, rotor shell plates and rotor angles in an air preheater.

DESCRIPTION OF THE PREFERRED EMBODIMENT

Figure 1:
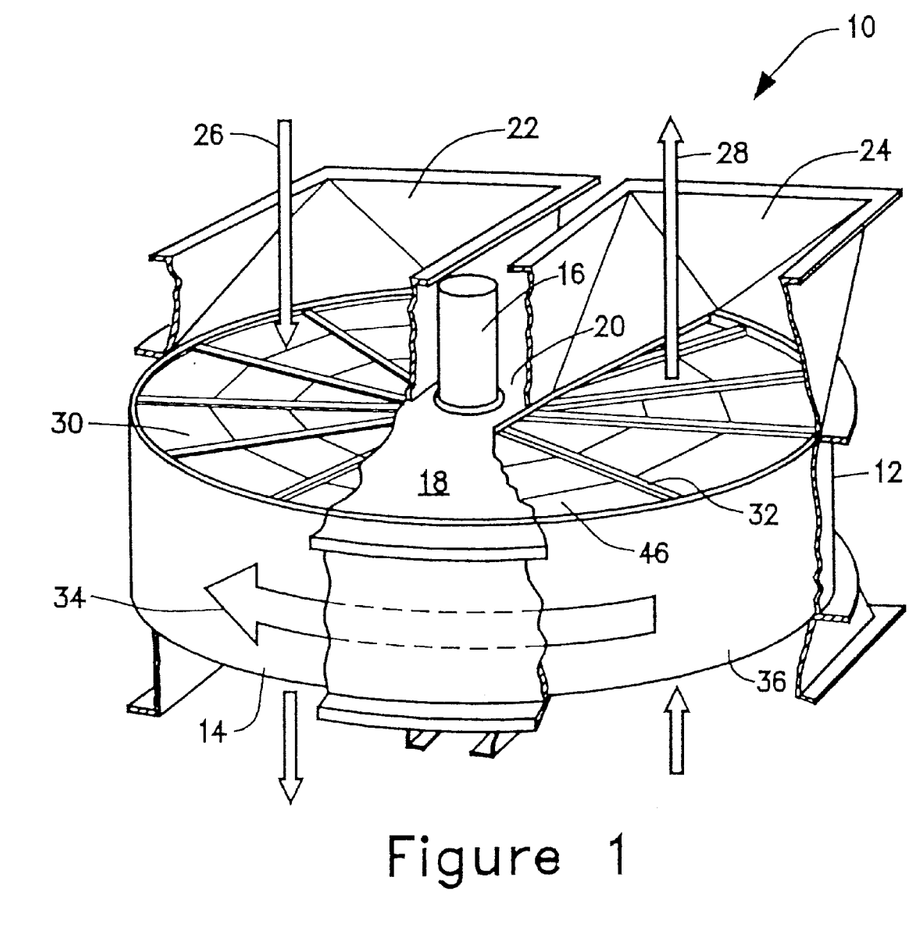
FIG. 1 is a general perspective view of a conventional rotary regenerative air preheater which is cut-away to show the upper sector plates.

FIG. 1 of the drawings is a partially cut-away perspective view of a typical bi-sector air preheater 10 showing a housing 12 in which the rotor 14 is mounted on a drive shaft or post 16. The housing is divided by means of the flow impervious sector plates 18 and 20 into a flue gas sector 22 and an air sector 24. Corresponding sector plates are also located on the bottom of the unit. Mounted on the inside of the housing 12 can be axial seal plates (not shown) which extend the full height of the rotor.

The hot flue gases enter the air preheater 10 as indicated by the arrow 26, flow through the flue gas sector 22 where heat is transferred to the heat transfer surface in the rotor 14. As this hot heat transfer surface then rotates through the air sector 24, the heat is transferred to the air flowing through the rotor from the bottom as indicated by the arrow 28. Consequently, the cold air inlet and the cooled gas outlet define a cold bottom end and the hot gas inlet and the heated air outlet define a hot top end, for a VI type air preheater. In a V type air preheater, the bottom end is the hot end and the top end is the cold end. In a horizontal air preheater, the arrangement is rotated ninety degrees. The rotor 14 is divided into a plurality of pie-shaped compartments 30 by the diaphragm plates 32 with each pair of adjacent diaphragm plates 32 defining an acute angle.

Figure 2:
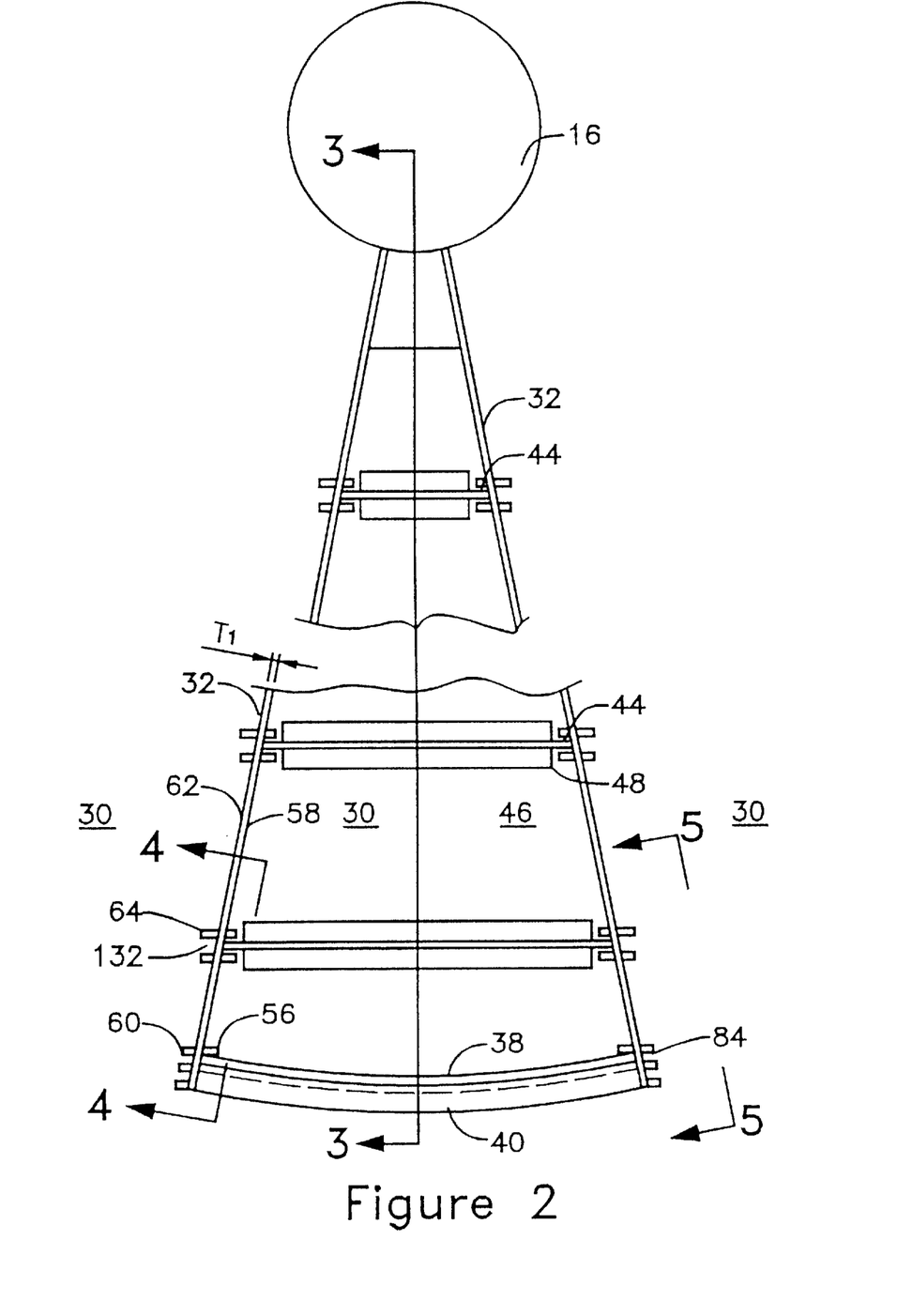
FIG. 2 is a simplified top view of a portion of a rotor in accordance with the present invention.
Figure 3:
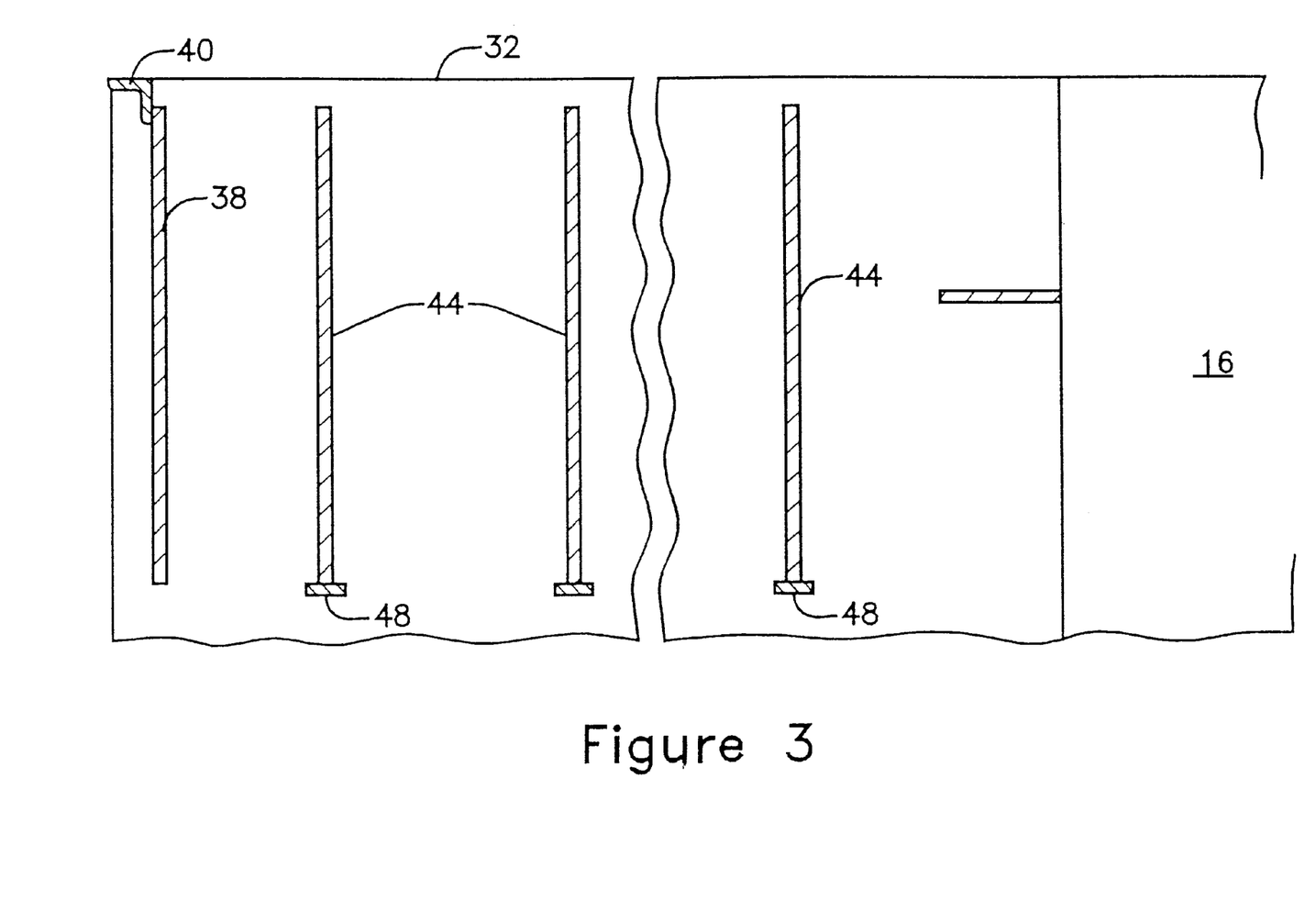
FIG. 3 is a cross-section view taken along line 3—3 of FIG. 2.

With additional reference to FIGS. 2 and 3, the rotor also has a shell 36 composed of individual shell plates 38 which extend between the outboard end portions of the diaphragm plates 32. Rotor angles 40, 42 extend radially outward from the shell plates 38. Extending between the diaphragm plates 32 are the stay plates 44 which are welded to the diaphragm plates 32. The stay plates 44 divide the compartment 30 into a plurality of radially adjacent basket compartments 46. In some air preheater designs a single stay plate 44 is provided at each radial location while in other designs, four or more stay plates are provided at each radial location. Heat exchange basket modules 34 are received within the basket compartments 46 and supported on basket supports 48.

Figure 4:
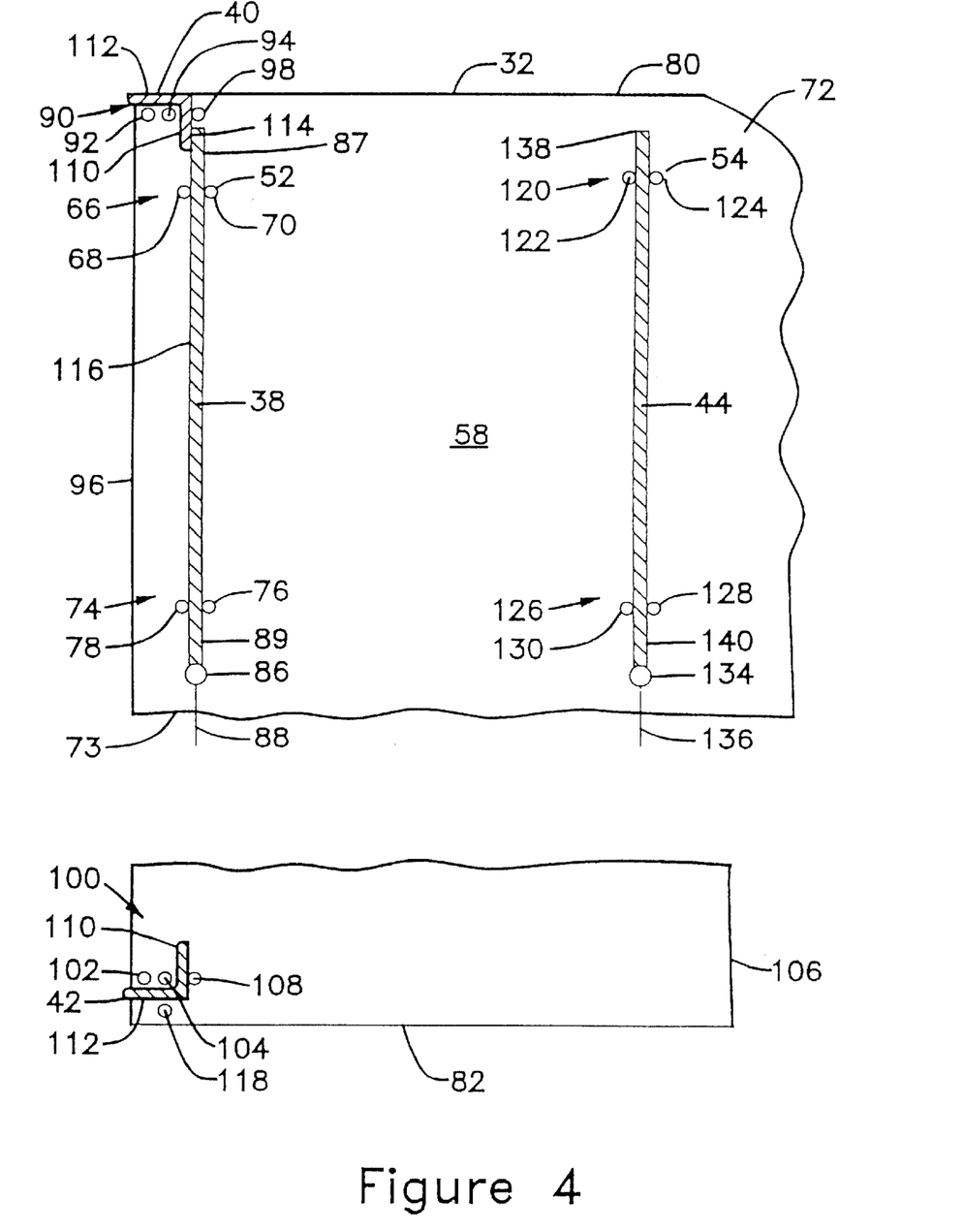
FIG. 4 is a cross section view taken along line 4—4 of FIG. 2.
Figure 9:
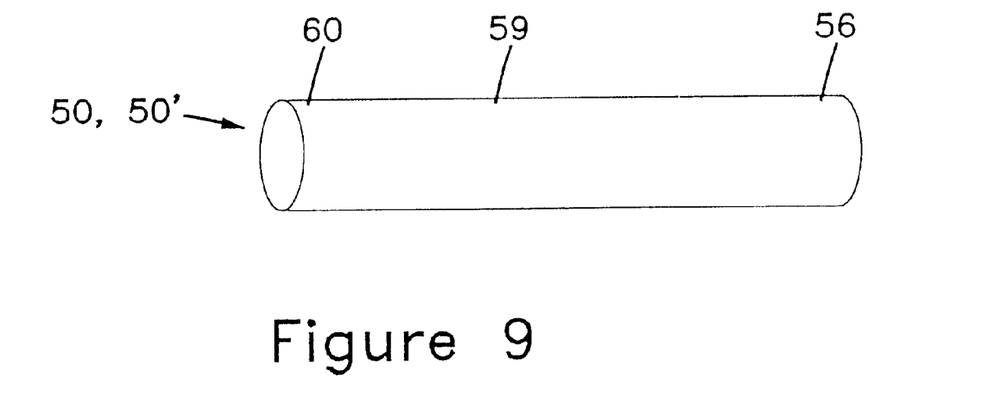
FIG. 9 is a perspective view of a pin in accordance with the invention.

With reference to FIGS. 4 and 9, a first embodiment of the invention employs a plurality of pins 50, 50' which are mounted on specially manufactured diaphragm plates 32 to locate and temporarily support the stay plates 44, the rotor shell plates 38, and the rotor angles 40, 42. The pin locations 52 are located on the diaphragm plate 32 by applying a template or other means to a diaphragm plate blank manufactured from sheet or plate steel in a conventional manner. The diaphragm plate blank is marked through openings in the template which identify the location 52 of each pin receptacle 54. A pin receptacle 54 is formed in the diaphragm plate 32 at each location 52. The pin receptacle 54 may be formed by drilling, punching, burning, or other conventional methods that provide for accurate, repeatable hole formation.

The locating pins 50 have a diameter substantially equal to ¼ inch while the support pins 50', which are used on the stay plates 44 and shell plates 38 have a diameter substantially equal to ⅜ inch. As. described below, a combination of shop-installed pins and field-installed pins may be used. Each pin 50, 50' is mounted to the diaphragm plate by inserting a first end portion 56 of the pin 50, 50' through an associated pin receptacle 54 such that the first end portion 56 extends a predetermined distance beyond the one side 58 of the diaphragm plate 32, an oppositely disposed second end portion 60, having a length substantially equal to that of the first end portion 56, extends beyond the opposite surface 62 of the diaphragm plate 32, and an intermediate engagement portion 59 is disposed within the pin receptacle 54 (FIG. 2). The pin 50, 50' is mounted to the diaphragm plate 32 with a tack weld 64 on one side of the diaphragm plate 32.

Each side of the rotor shell plate 38 is preferably located in the rotor 14 by four shop-installed pins and one field-installed pin. Locating pins 50 mounted in an upper pair 66 of first and second pin receptacles 68, 70 in the upper portion 72 of the outboard end portion 73 of the diaphragm plate 32 and in a lower pair 74 of third and fourth pin receptacles 76, 78 in the outboard end portion 73 in a position intermediate the top 80 and bottom 82 of the diaphragm plate 32 define a slot 84 for positioning the rotor shell plate 38. A support pin 50' mounted in a fifth pin receptacle 86 located below the lower pair 74 of pin receptacles 76, 78 and on the axis 88 of the slot 84 supports the rotor shell plate 38 and axially positions the rotor shell plate. The locating pins 50 mounted in the upper pair 66 of pin receptacles 68, 70, the locating pin 50 mounted in the inboard, third pin receptacle 76, and the support pin 50' mounted in the fifth pin receptacle 86 are all shop-installed.

The rotor shell plate 38 is installed by inserting the upper portion 87 of the rotor shell plate 38 through the portion of slot 84 between the locating pins 50 in the first and second pin receptacles 68, 70 and swinging the lower end portion 89 of the rotor shell plate 38 inboard to contact the locating pin 50 installed in the third pin receptacle 76 and to engage the support pin 50' installed in the fifth pin receptacle 86. Preferably, the rotor shell plate 38 is locked into place by mounting the field-installed locating pin 50 in the fourth pin receptacle 78.

The hot end and cold end rotor angles 40, 42 are each positioned and supported in the rotor 14 by three shop-installed locating pins 50. Locating pins 50 mounted in an upper pair 90 of sixth and seventh pin receptacles 92, 94 in the upper portion 72 of the diaphragm plate 32, adjacent the outboard end 96 of the diaphragm plate 32, axially locate and support the hot end rotor angle 40. A locating pin 50 mounted in a eighth pin receptacle 98 in the upper portion 72 of the diaphragm plate 32, inboard of the seventh pin receptacle 94, radially locates the hot end rotor angle 40. Locating pins 50 mounted in a lower pair 100 of ninth and tenth pin receptacles 102, 104 in the lower portion 106 of the diaphragm plate 32, adjacent the outboard end 96 of the diaphragm plate 32, axially locate the cold end rotor angle 42. A locating pin 50 mounted in a eleventh pin receptacle 108 in the lower portion 106 of the diaphragm plate 32, inboard of the tenth pin receptacle 104, radially locates the cold end rotor angle 42.

The hot end rotor angle 40 is installed by inserting axially extending segment 110 through a gap between the locating pins 50 mounted in the seventh and eighth pin receptacles 94, 98 such that radially extending segment 112 rests on the locating pins 50 mounted in the sixth and seventh pin receptacles 92, 94. When the hot end rotor angle 40 is fully installed, the inboard surface 114 of axially extending segment 110 will engage the outboard surface 116 of the rotor shell plate 38, whereby rotor shell plate 38 will also radially locate the hot end rotor angle 40. The hot end rotor angle 40 is "locked" in place by gravity. The cold end rotor angle 42 is installed by inserting the axially extending segment 110 through a gap between the locating pins 50 in the tenth and eleventh pin receptacles 104, 108. Preferably, a locating pin 50 is field-installed in a twelfth pin receptacle 118 in the lower portion 106 of the diaphragm plate 32, adjacent the lower end 82 of the diaphragm plate 32, to support and lock the cold end rotor angle 42 in position.

Each side of each stay plate 44 is preferably located in the rotor 14 by four shop-installed pins and one field-installed pin. It should be appreciated that each compartment 30 generally contains more than one stay plate 44, as shown in FIG. 2. Therefore, the following description applies to each of the stay plates 44.

Locating pins 50 mounted in an upper pair 120 of thirteenth and fourteenth pin receptacles 122, 124 in the upper portion 72 of the diaphragm plate 32 and in a lower pair 126 of fifteenth and sixteenth pin receptacles 128, 130 in a position intermediate the top 80 and bottom 82 of the diaphragm plate 32 define a slot 132 for positioning the stay plate 44. A support pin 50' mounted in a seventeenth pin receptacle 134 located below the lower pair 126 of pin receptacles 128, 130 and on the axis 136 of the slot 132 supports the stay plate 44 and axially positions the stay plate 44. The locating pins 50 mounted in the upper pair 120 of pin receptacles 122, 124, the locating pin 50 mounted in the inboard, fifteenth pin receptacle 128, and the support pin 50' mounted in the seventeenth pin receptacle 134 are all shop-installed.

The stay plate 44 is installed by inserting the upper end portion 138 of the stay plate 44 between the locating pins 50 in the thirteenth and fourteenth pin receptacles 122, 124 and swinging the lower end portion 140 of the stay plate 44 inboard to contact the locating pin 50 installed in the fifteenth pin receptacle 128 and to engage the support pin 50' installed in the seventeenth pin receptacle 134. Preferably, the stay plate 44 is locked into place by mounting the field-installed locating pin 50 in the sixteenth pin receptacle 130. There is a gap between each end of the basket support 48 and the adjacent diaphragm plate 32 which is at least as great as the length of the end portions 56, 60 the pins 50, 50' which prevents the basket support 48 from contacting the pins 50, 50' as the stay plates 44 are installed. Consequently, the basket supports 48 are mounted to the bottom of the stay plates 44.

When the shop-installed pins and the field-installed pin are utilized together, the stay plate 44, the cold end rotor angle 42, and the rotor shell plate 38 are locked in place within the compartment 30 while the remainder of the rotor 14 is being constructed. Alternatively, any of these components 38, 42, 44 may be positioned utilizing only the shop-installed pins and temporarily tack welded in place. The components 38, 42, 44 which are temporarily tack welded in place are permanently mounted with a skip weld when the rotor 14 is fully assembled. It should be appreciated that utilizing a combination of shop-installed pins and field-installed pins eliminates the requirement for tack welding any of these components 38, 40, 42, 44.

Due to their size and location, the pins 50, 50' mounted in pin receptacles 118 and 134 may interfere with installation of the heat exchange basket modules 34, the pins 50 mounted in pin receptacles 92, 94, 102, and 104 may interfere with axial seal installation, and the pin 50 mounted in pin receptacle 118 may interfere with radial seal installation. Consequently, these pins 50, 50' may be removed after the rotor 14 is completely assembled and the stay plates 44, the rotor shell plates 38, and rotor angles 40, 42 are skip welded in place. The other pins 50, 50' are sized and placed such that they do not interfere with the installation of other air preheater components and removal is therefore not be required.

Figure 10:
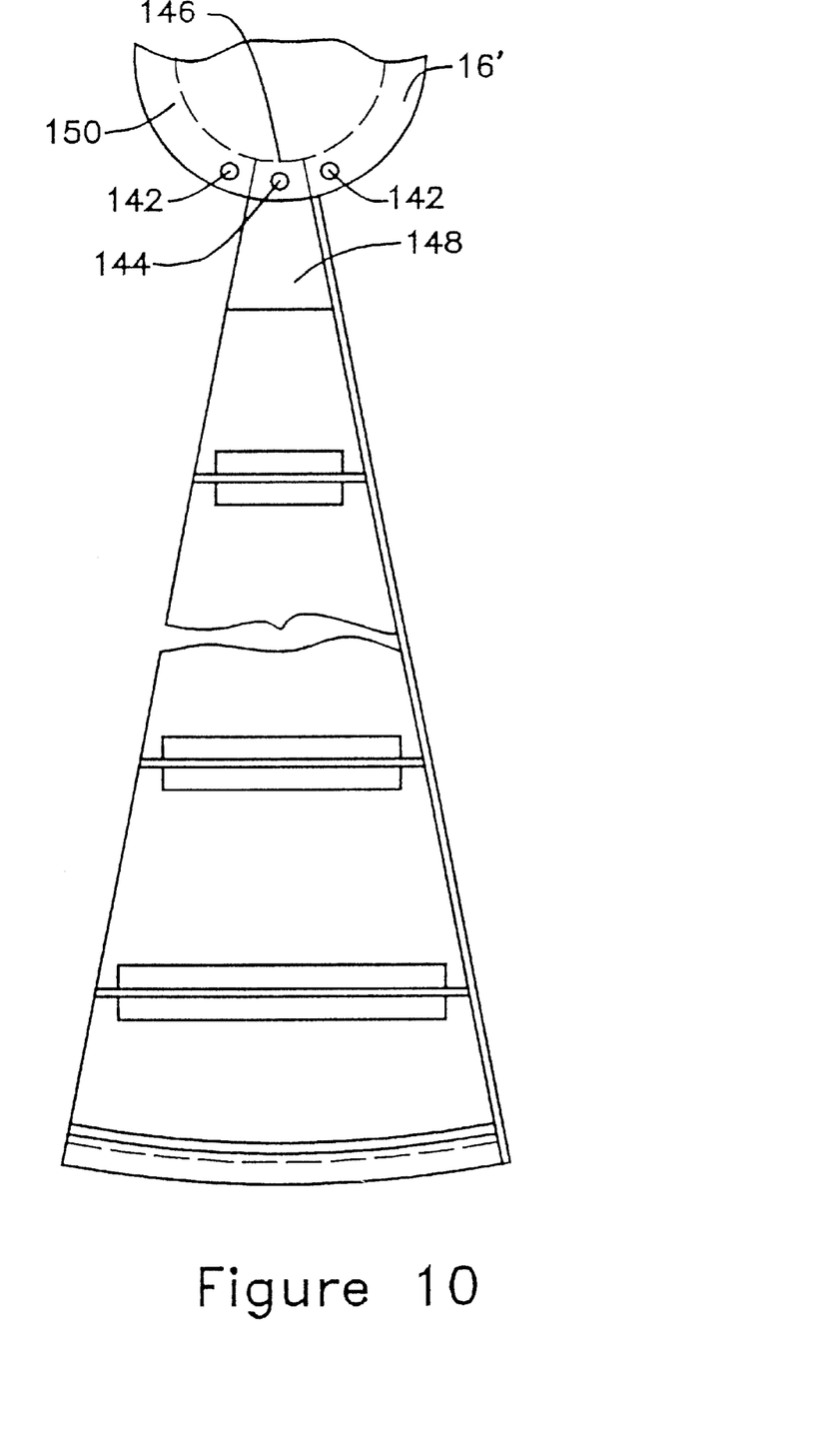
FIG. 10 is a simplified top view of a portion of a semi-modular rotor in accordance with the present invention.

The semi-modular rotor design disclosed in U.S. Pat. No. 5,615,732, assigned to the assignee of the subject application and hereby incorporated by reference, may also be modified to incorporate at least a portion of the subject invention. With reference to FIG. 10, the post 16' may be modified to include a pair of positioning pins 142 and a mounting pin 144 disposed between the positioning pins 142. The inboard end portion 146 of the sector lug 148 is positioned between the positioning pins 142 and the mounting pin 144 is inserted through openings in the post rim 150 and the lug 148 to mount the sector to the post 16'. It should be appreciated that this mounting scheme may also be used in other air preheater designs.

With reference to FIGS. 5–8, a second embodiment of the invention employs diaphragm plates 32' having a plurality of slots 152 for receiving tabs 154 on the stay plates 44', the rotor shell plates 38', and the rotor angles 40', 42'. The slots 152 are located on the diaphragm plate 32' utilizing a template or other means for locating each slot and a slot 152 is formed in the diaphragm plate 32' at each location identified by the template. The slot 152 may be formed by drilling, punching, burning, or other conventional methods that provide for accurate, repeatable slot formation. The slots 152 extend completely through each diaphragm plate 32' and receive tabs 154 from the stay plates 44', the rotor shell plates 38', and the rotor angles 40', 42' on both sides of the diaphragm plate 32'. The slots 152 are approximately 3" long and have a width substantially equal to the sum of the thickness of the corresponding tab 154 plus approximately $\frac{1}{16}$ inch.

The number of slots 152 in the diaphragm plate 32' for each of the components 38', 40', 42', 44' correspond to the number of tabs 154 on each particular item. Preferably, each rotor shell plate 38' is located in the rotor 14 by four tabs 156, 158, 160, 162, with two tabs extending from each side 164, 166 of the rotor shell plate 38'. However, as few as three tabs would suffice. Preferably, each stay plate 44' is located in the rotor by five tabs 154, with three tabs 168, 170, 172 extending from one side 178 and two tabs 174, 176 extending from the opposite side 180. However, as few as three tabs would suffice. The hot and cold end rotor angles 40' 42' are each located in the rotor 14 by a tab 182 on each end 184 of the rotor angle 40', 42'. It should be appreciated that the rotor shell plate 38' and stay plates 44' may have more than four and five tabs, respectively. It should be further appreciated that all of the rotor shell plates 38' in a given rotor 14 will be identically constructed and that at least each stay plate 44' mounted at the same radial location will be identically constructed.

Figure 5:
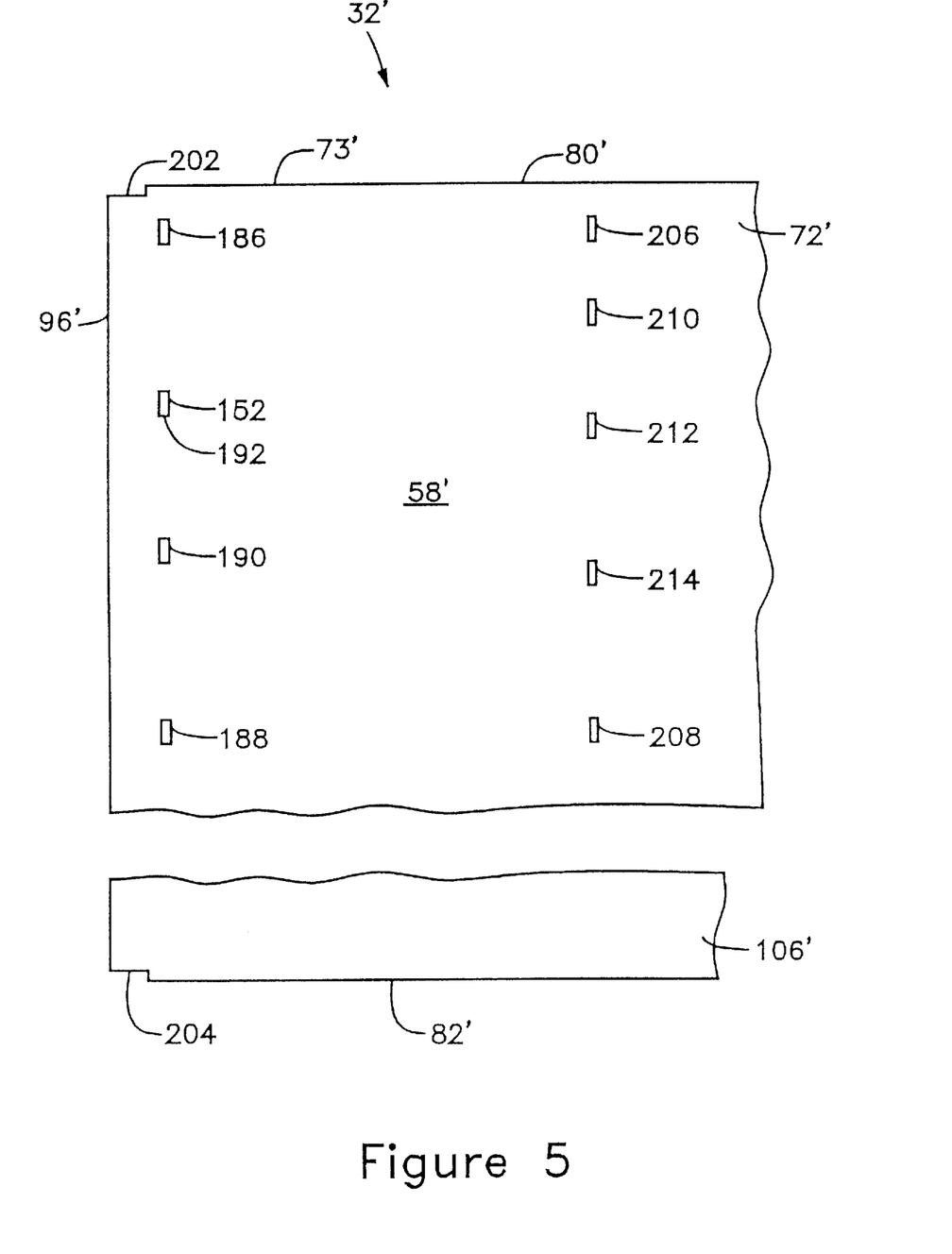
FIG. 5 is a side view of a second embodiment of the diaphragm plate as seen from line 5—5 of FIG. 2.
Figure 7:
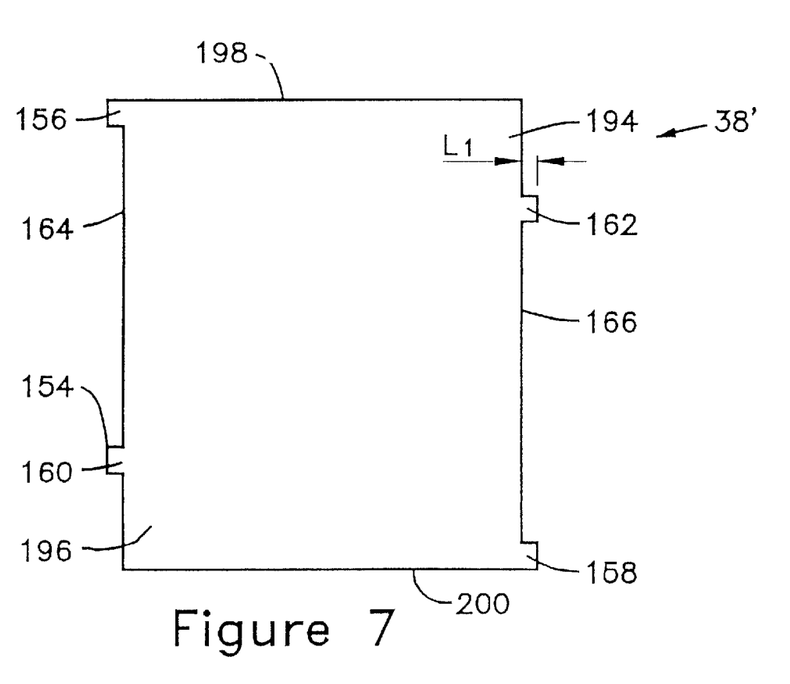
FIG. 7 is a side view of a second embodiment of the rotor shell of FIG. 2.

In the preferred embodiment, there are four axially spaced slots 186, 188, 190, 192 formed in the outboard end portion 73' of the diaphragm plate 32' for receiving tabs 154 on the rotor shell plates 38' disposed in the compartments 30 on either side of the diaphragm plate 32'. The first slot 186, formed in the upper portion 72' of the diaphragm plate 32', receives a first tab 156 extending from the upper portion 194 of the left, first side 164 of the rotor shell plate 38' disposed in the compartment 30 on the right, first side 58' of the diaphragm plate 32'. The second slot 188, formed in a lower portion 106' of the diaphragm plate 32', receives a second tab 158 extending from the lower portion 196 of the right, second side 166 of the rotor shell plate 38' disposed in the compartment 30 on the left, second side 62' of the diaphragm plate 32'. The third slot 192, formed at a vertical position intermediate the first and second slots 186, 188, receives a third tab 160 extending from a position intermediate the upper and lower ends 198, 200 of side 164 of the rotor shell plate 38'. The fourth slot 190, formed at a vertical position intermediate the first and second slots 186, 188, receives a fourth tab 162 extending from a position intermediate the upper and lower ends 198, 200 of side 166 of the rotor shell plate 38'. It should be appreciated that the third tab 160 must be located at either a lower position than the fourth tab 162, as shown in FIG. 7, or at a higher position than the fourth tab 162.

The tabs 156, 158, 160, 162 have a length L1 which less than that of the slot 186, 188, 192, 190 and extend the thickness T1 of the diaphragm plate 32' minus approximately $\frac{1}{16}$ inch. The slots 186, 188, 190, 192 index the rotor shell plate location both axially and radially and secures the rotor shell plate 38', eliminating the need for tack welding the rotor shell plate 38' into place.

Figure 8:
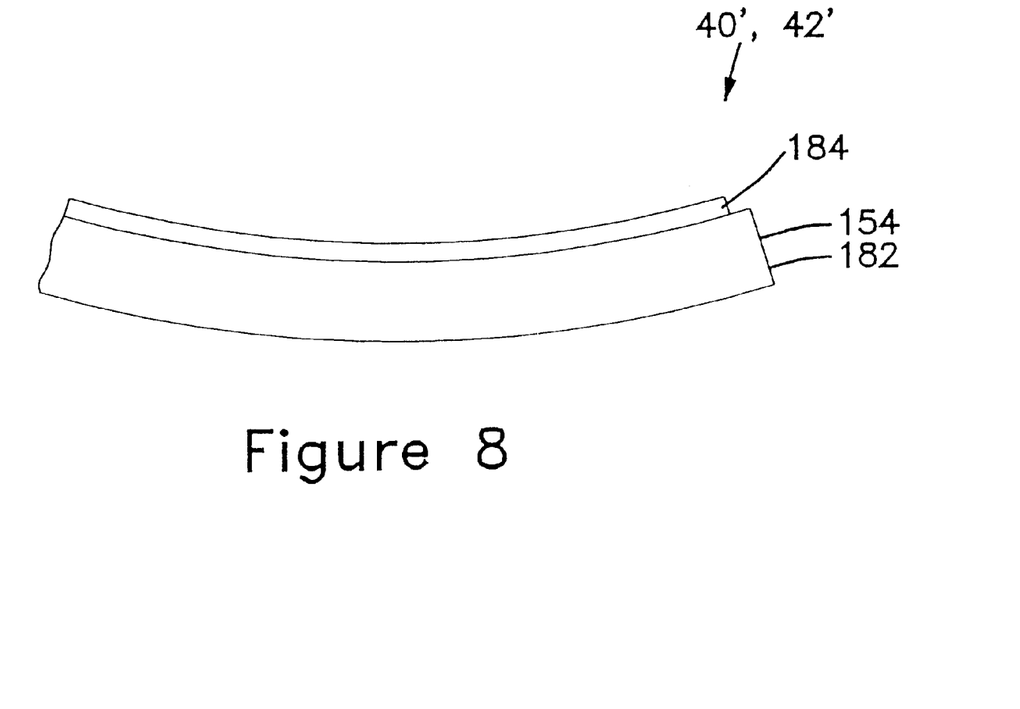
FIG. 8 is a top view of a second embodiment of the rotor angle of FIG. 2.

There is a fifth slot or notch 202 formed in the upper portion 72' of the outboard end portion 73' of the diaphragm plate 32' for receiving the tabs 182 on the hot end rotor angles 40' disposed in the compartments 30 on either side of the diaphragm plate 32'. Based on the particular air preheater design, there may be a sixth slot or notch 204 formed in the lower portion 106' of the outboard end portion 73' of the diaphragm plate 32' for receiving the tabs 182 on the cold end rotor angles 42' disposed in the compartments 30 on either side of the diaphragm plate 32'. The tabs 182 on each end of the rotor angle 40', 42' extend one half the thickness T1 of the diaphragm plate 32' minus approximately 1/32 inch. If the air preheater design does not allow the tabs 182 on the cold end rotor angle 42' to secure it in position, the cold end rotor angle 42' is secured by a tack weld. If the cold end rotor angle 42' is secured in position by tabs 182, the need for tack welding may be eliminated.

It should be appreciated that each compartment 30 generally contains more than one stay plate 44', as shown in FIG. 2. In the preferred embodiment, each stay plate 44' is located in the rotor 14 by three tabs 168, 170, 172 which extend from a first side 178 of the stay plate 44' and two tabs 174, 176 which extend from the second side 180. Therefore, the following description applies to each of the stay plates 44'.

Figure 6:
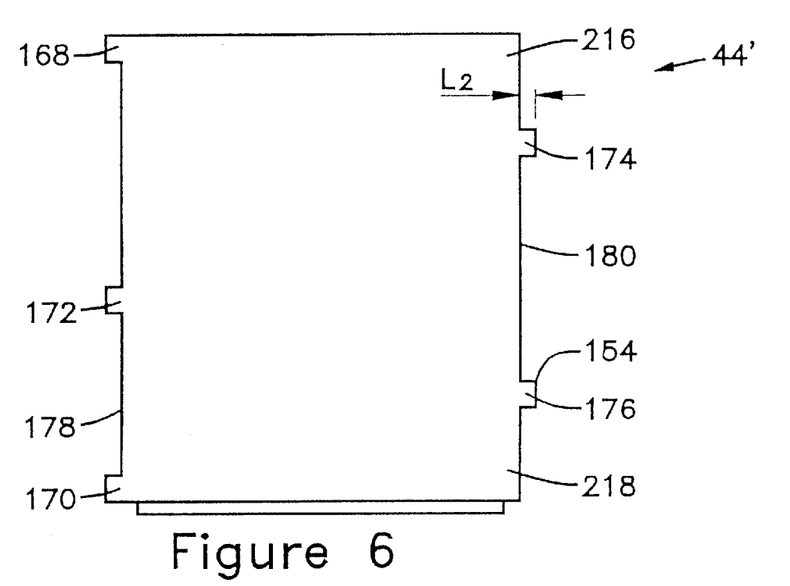
FIG. 6 is a side view of a second embodiment of the stay plate of FIG. 2.

In the preferred embodiment, there are five axially spaced slots 206, 208, 210, 212, 214 formed in the diaphragm plate 32' at each radial stay plate location for receiving tabs 154 on the stay plates 44' disposed in the compartments 30 on either side of the diaphragm plate 32'. The seventh slot 206, formed in the upper portion 72' of the diaphragm plate 32', receives a first tab 168 extending from the upper portion 216 of the left, first side 178 of the stay plate 44' disposed in the compartment 30 on the right, first side 58' of the diaphragm plate 32'. The eighth slot 208, formed in a lower portion 106' of the diaphragm plate 32', receives a second tab 170 extending from the lower portion 218 of the left, first side 178 of the diaphragm plate 32'. Ninth, tenth, and eleventh slots 210, 212, 214 are formed at locations intermediate the seventh and eighth slots 206, 208, with the tenth slot 212 being disposed intermediate the ninth and eleventh slots 210, 214. The tenth slot 212 receives a third tab 172 extending from the left, first side 178 of stay plate 44', at a position intermediate the first and second tabs 168, 170. The ninth and eleventh slots 210, 214 receive fourth and fifth tabs 174, 176 extending from the right, second side of the stay plate disposed in the compartment on the left, second side 62' of the diaphragm plate 32'. As shown in FIG. 6, the fourth tab 174 is located at a vertical position which is intermediate the first and third tabs 168, 172 and the fifth tab 176 is located at a vertical position which is intermediate the third and second tabs 172, 170. Alternatively, each stay plate 44' may have two tabs on the left side 178 and three tabs on the right side 180.

The tabs 168, 170, 172, 174, 176 have a length L2 less than that of the slot 206, 208, 210, 212, 214 and extend the thickness T1 of the diaphragm plate 32' minus approximately 1/16 inch. The slots 206, 208, 210, 212, 214 index the stay plate location both axially and radially and secures the stay plate 44', eliminating the need for tack welding the stay plates 44' into place.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method for constructing a rotor of an air preheater, the rotor including a plurality of diaphragm plates dividing the rotor into a predetermined number of wedge-shaped compartments, each of the compartments being defined by adjacent diaphragm plates and including at least one compartment component selected from the group consisting of a rotor shell plate, a hot end rotor angle, a cold end rotor angle, and one or more stay plates, the method comprising the steps of:
  (a) manufacturing a plurality of diaphragm plates by
    (i) marking at least one index location associated with each compartment component on a plurality of diaphragm plate blanks utilizing template means for identifying the index locations, and
    (ii) forming an opening at each index location marked on each diaphragm plate blank;
  (b) assembling a compartment by
    (i) positioning a first diaphragm plate adjacent to a second diaphragm plate, the first and second diaphragm plates defining an acute angle, and
    (ii) locating each compartment component between the adjacent diaphragm plates with locating means for locating at least a portion of each compartment component, the locating means for each compartment component being engageable with an associated opening in one of the diaphragm plates;
  (c) repeating step (b) to produce the predetermined number of compartments defining the rotor; and
  (d) fixedly mounting the compartment components to the diaphragm plates.

2. The method of claim 1 wherein each of the compartment components has oppositely disposed first and second sides and the locating means comprises at least one tab extending from each of the sides of the compartment components, step (b)(ii) further comprising the step of inserting the tab extending from the first side of each compartment component into the associated opening in the first diaphragm plate and inserting the tab extending from the second side of each compartment component into the associated opening in the second diaphragm plate.

3. The method of claim 1 wherein each of the compartment components has oppositely disposed first and second sides, each of the diaphragm plates has oppositely disposed hot and cold ends, oppositely disposed inboard and outboard ends, an outboard end portion, and at least one intermediate portion disposed intermediate the inboard and outboard ends, the outboard end portion defining first, second, third, and fourth axially spaced openings, the locating means of the rotor shell plates comprises a first pair of axially spaced tabs extending from the first side of the rotor shell plate and a second pair of axially spaced tabs extending from the second side of the rotor shell plate, step (b)(ii) further comprising the step of inserting the first pair of tabs of the rotor shell plate into the first and fourth openings of the first diaphragm plate and inserting the second pair of tabs of the rotor shell plate into the second and third openings of the second diaphragm plate.

4. The method of claim 3 wherein the outboard end portion of each diaphragm plate further defines a fifth opening extending from the outboard and hot ends, the locating means of the hot end rotor angle comprises a tab extending from the first side and a tab extending from the second side, step (b)(ii) further comprising the step of inserting the tab extending from the first side of the hot end rotor angle into the fifth opening of the first diaphragm plate and inserting the tab extending from the second side of the hot end rotor angle into the fifth opening of the second diaphragm plate.

5. The method of claim 4 wherein the outboard end portion of each diaphragm plate further defines a sixth opening extending from the outboard and cold ends, the locating means of the cold end rotor angle comprises a tab extending from the first side and a tab extending from the second side, step (b)(ii) further comprising the step of inserting the tab extending from the first side of the cold end rotor angle into the sixth opening of the first diaphragm plate and inserting the tab extending from the second side of the cold end rotor angle into the sixth opening of the second diaphragm plate.

6. The method of claim 4 wherein each intermediate portion defines seventh, eighth, ninth, tenth, and eleventh axially spaced openings, the locating means of each stay plate comprises a trio of tabs extending from the first side of the stay plate and a pair of tabs extending from the second side of the stay plate, step (b)(ii) further comprising the step of inserting the trio of tabs into the seventh, eighth, and tenth openings of the first diaphragm plate and inserting the pair of tabs into the ninth and eleventh openings of the second diaphragm plate.

7. The method of claim 1 wherein each diaphragm plate has oppositely disposed first and second sides, the first side of one of the adjacent diaphragm plates and the second side of the other of the adjacent diaphragm plates defining the compartment therebetween, the locating means comprises a pin having first and second end portions and a mounting portion disposed therebetween, and each of the openings defines a pin receptacle, step (b)(i) further comprising the steps of (1) inserting the first end portion of one of the pins through one of the pin receptacles until the mounting portion is disposed within the pin receptacle and the first and second end portions extend from the first and second sides of the diaphragm plate, respectively, (2) mounting the pin to the diaphragm plate, (3) repeating steps (b)(i)(1) and (b)(i)(2) until a pin is mounted in predetermined pin receptacles.

8. The method of claim 7 wherein each of the rotor shell plates has oppositely disposed hot and cold ends and hot and cold end portions and each of the diaphragm plates has oppositely disposed hot and cold ends, hot and cold end portions, oppositely disposed inboard and outboard ends, and an outboard end portion, the outboard end portion defining an upper pair of first and second pin receptacles disposed in the hot end portion thereof, a lower pair of third and fourth pin receptacles disposed at a position intermediate the hot and cold ends, and a fifth pin receptacle positioned intermediate the lower pair of pin receptacles and the cold end and substantially on an axis defined by the upper and lower pairs of pin receptacles, pins are mounted in the first, second, third, and fifth pin receptacles, step (b)(ii) further composing the steps of (1) inserting the hot end portion of the rotor shell plate through a gap defined by the pins mounted in the first and second pin receptacles until the cold end of the rotor shell plate is axially disposed between the hot end and the pin mounted in the fifth pin receptacle, (2) rotating the cold end portion of the rotor shell plate toward the inboard end of the diaphragm until the rotor shell plate contacts the pin mounted in the third pin receptacle, (3) moving the rotor shell plate toward the cold end of the diaphragm plate until the cold end of the rotor shell plate engages the pin mounted in the fifth pin receptacle, and (4) securing the rotor shell plate in position.

9. The method of claim 8, step (b)(ii)(4) comprising the steps of inserting the first end portion of one of the pins through the fourth pin receptacle until the mounting portion is disposed within the fourth pin receptacle and the first and second end portions extend from the first and second sides of the diaphragm plate, respectively, and mounting the pin to the diaphragm plate.

10. The method of claim 8, step (b)(ii)(4) comprising the step of tack welding the rotor shell plate in place.

11. The method of claim 7 wherein the hot end rotor angle has an axially extending segment and a radially extending segment and each of the diaphragm plates has oppositely disposed hot and cold ends, hot and cold end portions, oppositely disposed inboard and outboard ends, and an outboard end portion, the outboard end portion defining sixth, seventh and eighth pin receptacles disposed adjacent the hot end, the sixth pin receptacle being disposed adjacent the outboard end, the eighth pin receptacle being disposed intermediate the inboard and outboard ends, and the seventh pin receptacle being disposed intermediate the sixth and eighth pin receptacles, pins being mounted in the sixth, seventh, and eighth pin receptacles, step (b)(ii) further comprising the steps of (1) inserting the axially extending segment of the hot end rotor angle through a gap defined by the pins mounted in the seventh and eighth pin receptacles, and (2) engaging the radially extending segment of the hot end rotor angle with the pins mounted in the sixth and seventh pin receptacles.

12. The method of claim 7 wherein the cold end rotor angle has an axially extending segment and a radially extending segment and each of the diaphragm plates has oppositely disposed hot and cold ends, hot and cold end portions, oppositely disposed inboard and outboard ends, and an outboard end portion, the outboard end portion defining ninth, tenth, and eleventh pin receptacles disposed adjacent the cold end, the ninth pin receptacle being disposed adjacent the outboard end, the eleventh pin receptacle being disposed intermediate the inboard and outboard ends, and the tenth pin receptacle being disposed intermediate the ninth and eleventh pin receptacles, pins being mounted in the ninth, tenth, and eleventh pin receptacles, step (b)(ii) further comprising the steps of (1) inserting the axially extending segment of the cold end rotor angle through a gap defined by the pins mounted in the tenth and eleventh pin receptacles, (2) engaging the radially extending segment of the cold end rotor angle with the pins mounted in the ninth and tenth pin receptacles, and (3) securing the cold end rotor angle in axial position.

13. The method of claim 12 wherein the outboard end portion further defines a twelfth pin receptacle disposed intermediate the ninth, tenth, and eleventh pin receptacles and the cold end, step (b)(ii)(3) comprising the steps of inserting the first end portion of one of the pins through the twelfth pin receptacle until the mounting portion is disposed within the twelfth pin receptacle and the first and second end portions extend from the first and second sides of the diaphragm plate, respectively, and mounting the pin to the diaphragm plate.

14. The method of claim 12, further comprising the step of (e) removing the pin mounted in the twelfth pin receptacle.

15. The method of claim 12, step (b)(ii)(3) comprising the step of tack welding the cold end rotor angle in place.

16. The method of claim 7 wherein each of the shell plates has oppositely disposed hot and cold ends and hot and cold end portions and each of the diaphragm plates has oppositely disposed hot and cold ends, hot and cold end portions, oppositely disposed inboard and outboard ends, and at least one intermediate portion disposed intermediate the inboard and outboard ends, the intermediate portion defining an upper pair of thirteenth and fourteenth pin receptacles disposed in the hot end portion thereof, a lower pair of fifteenth and sixteenth pin receptacles disposed at a position intermediate the hot and cold ends, and a seventeenth pin receptacle positioned intermediate the lower pair of fifteenth and sixteenth pin receptacles and the cold end and substantially on an axis defined by the upper and lower pairs of pin receptacles, pins are mounted in the thirteenth, fourteenth, fifteenth, and seventeenth pin receptacles, step (b)(ii) further composing the steps of (1) inserting the hot end portion of the shell plate through a gap defined by the pins mounted in the thirteenth and fourteenth pin receptacles until the cold end of the shell plate is axially disposed between the hot end and the pin mounted in the seventeenth pin receptacle, (2) rotating the cold end portion of the shell plate toward the inboard end of the diaphragm until the shell plate contacts the pin mounted in the fifteenth pin receptacle, (3) moving the shell plate toward the cold end of the diaphragm plate until the cold end of the shell plate engages the pin mounted in the seventeenth pin receptacle, and (4) securing the stay plate in position.

17. The method of claim 16, step (b)(ii)(4) comprising the steps of inserting the first end portion of one of the pins through the sixteenth pin receptacle until the mounting portion is disposed within the sixteenth pin receptacle and the first and second end portions extend from the first and second sides of the diaphragm plate, respectively, and mounting the pin to the diaphragm plate.

18. The method of claim 16, further comprising the step of (e) removing the pin mounted in the seventeenth pin receptacle.

19. The method of claim 15, step (b)(ii)(4) comprising the step of tack welding the stay plate in place.

20. A diaphragm plate for the rotor of an air preheater, the rotor comprising a plurality of wedge-shaped compartments, each of the compartments including at least one compartment component selected from the group consisting of a rotor shell plate, a hot end rotor angle, a cold end rotor angle, and one or more stay plates, each of the compartment components having locating means for locating the compartment component in the compartment, the diaphragm plate comprising oppositely disposed hot and cold ends, oppositely disposed inboard and outboard ends, an outboard end portion, and at least one intermediate portion disposed intermediate the inboard and outboard ends, the outboard end portion defining first, second, third, and fourth axially spaced openings adapted for receiving the locating means of the rotor shell plate, each diaphragm plate defining a fifth opening extending from the outboard end for receiving the locating means of the hot end rotor angle and the hot end and a sixth opening extending from the outboard end and the cold end for receiving the locating means of the cold end rotor angle, each intermediate portion defining seventh, eighth, ninth, tenth, and eleventh axially spaced openings for receiving the locating means of one of the stay plates.

* * * * *